United States Patent [19]

Grantham

[11] 4,236,984
[45] Dec. 2, 1980

[54] HYDROGEN GAS GENERATION UTILIZING A BROMIDE ELECTROLYTE, AN AMORPHOUS SILICON SEMICONDUCTOR AND RADIANT ENERGY

[75] Inventor: Daniel H. Grantham, Glastonbury, Conn.

[73] Assignee: United Technologies Corporation, Hartford, Conn.

[21] Appl. No.: 96,596

[22] Filed: Nov. 21, 1979

Related U.S. Application Data

[63] Continuation-in-part of Ser. No. 956,760, Nov. 1, 1978.

[51] Int. Cl.³ ............................ C25B 1/02; C25B 1/00; H01L 31/04
[52] U.S. Cl. .................................. 204/129; 204/128; 204/DIG. 3; 429/111
[58] Field of Search ................ 204/128, 129, DIG. 3; 429/111

[56] References Cited

U.S. PATENT DOCUMENTS

| | | | |
|---|---|---|---|
| 4,011,149 | 3/1977 | Nozik | 204/129 |
| 4,021,323 | 5/1977 | Kilby et al. | 204/129 |
| 4,094,751 | 6/1978 | Nozik | 204/80 |
| 4,182,796 | 1/1980 | Heller et al. | 429/111 |

OTHER PUBLICATIONS

W. A. Gerrard et al., "Solar Energy Conversion Using Semiconducting Photoanodes," *J. Vac. Sci. Technol.*, vol. 15, pp. 1155-1165, (1978).
D. Cahen et al., "Materials Aspects of Photoelectrochemical Systems," *Solar Energy Materials*, vol. 1, pp. 343-355, (1979).
K. Rajeshwar et al., "Energy Conversion in Photoelectrochemical Systems-A Review," *Electrochimica Acta*, vol. 23, pp. 1117-1143, (1978).
M. Tomkiewicz et al., "Photoelectrolysis of Water with Semiconductors," *Appl. Phys.*, vol. 18, pp. 1-28, (1979).
H. Gerischer, "Solar Photoelectrolysis with Semiconductor Electrodes," *Topics in Applied Physics*, vol. 31, Solar Energy Conversion, Edited by B. O. Seraphin, Springer-Verlag, (1979), pp. 115-172.

*Primary Examiner*—Aaron Weisstuch
*Attorney, Agent, or Firm*—Harry J. Gwinnell

[57] ABSTRACT

Radiant energy in conjunction with an n-type amorphous silicon semiconducting photoanode to at least partially power an electrolytic cell is used in the generation of hydrogen, utilizing a bromide, preferably hydrogen bromide, as the essential electrolyte component in the electrolytic cell to solve overvoltage and corrosion problems associated with the use of conventional electrolytes in similar environments. The use of the bromide electrolyte results in the broadening of the selection of semiconductor electrodes which can be used in the process and apparatus of the present invention enabling the amorphous silicon semiconducting electrode to be used with superior anticorrosive and radiant energy gathering results over conventional systems. To insure against corrosion, the amorphous silicon semiconductor should preferably be used with a thin layer of platinum overcoating. The hydrogen generated from such system can be used to power a fuel cell.

12 Claims, 3 Drawing Figures

HYDROGEN GAS GENERATION UTILIZING A BROMIDE ELECTROLYTE, AN AMORPHOUS SILICON SEMICONDUCTOR AND RADIANT ENERGY

This application is a continuation-in-part of copending U.S. application Ser. No. 956,760 filed Nov. 1, 1978.

CROSS REFERENCE TO RELATED APPLICATIONS

Copending applications filed by the same inventor containing disclosure related to the disclosure of the present invention are U.S. Ser. Nos. 956,761 filed Nov. 1, 1978 which teaches a method for generating HBr electrolyte, 56,565 filed July 11, 1979, a division of 956,761 which teaches apparatus useful for such method, and 65,824 filed Aug. 13, 1979 which is a continuation-in-part of 956,760 and teaches the use of a BP semiconductor in the process of 956,760.

BACKGROUND OF THE INVENTION

1. Field of the Invention

The field of art to which this invention pertains is electrolytic processes for producing hydrogen gas.

2. Description of the Prior Art

The use of solar energy to power electrolytic cells has received widespread attention in view of the recent energy resource depletion and environmental pollution awareness. The production of hydrogen from electrolytic cells and the use of solar energy to power such cells has been recognized by the prior art as a marriage of two arts which has great potential in the solution of both these problems. While much work has been done on improving the efficiency of such systems, more work is needed in view of the low energy levels involved in extracting useful energy from the sun (i.e. low extractable voltages from sunlight per square foot of collection apparatus) and in view of the overvoltage and corrosion problems associated with the use of conventional electrolytes in this environment. The range of semiconductor material useful to gather this potentially great source of energy in this environment has also been limited because of the corrosive effects of conventional electrolytes on such semiconductors.

For example, in an article by Frank and Bard (*Journal of the American Chemical Society*, Volume 99, July 1977, pgs. 4667–4675) the problem of corrosion of the electrode surfaces in photo-assisted electrolysis systems is described.

What is needed is an electrolyte system useful in basically conventional electrolytic cells which are at least partially radiant energy powered and which will produce hydrogen to power a fuel cell while solving the inefficient overpotential and corrosion problems associated with the use of conventional electrolyte systems. What is also needed is a system which will expand the use of available semiconductor material which can be used in such systems to provide more flexibility in establishing photoelectric processes with greater efficiency.

BRIEF SUMMARY OF THE INVENTION

In accordance with the present invention, electrolytic processes for producing hydrogen gas useful to power a fuel cell have been invented which utilize bromides, and especially hydrogen bromide as the essential electrolyte, in conjunction with an amorphous silicon semiconducting electrode, thereby solving the overpotential and corrosion problems associated with the use of conventional electrolytes in this environment in maximizing the efficiency of such photoelectrolytic processes.

The foregoing and other objects, features and advantages of the present invention will become more apparent in light of the following detailed description of preferred embodiments thereof as discussed and illustrated in the accompanying drawings.

DESCRIPTION OF PREFERRED EMBODIMENTS

Figure 1:
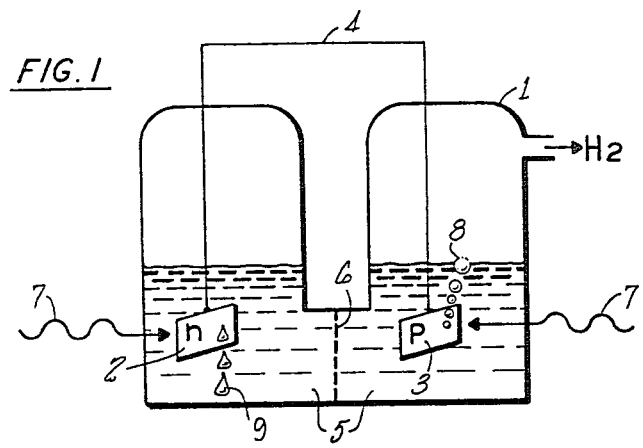
FIG. 1 describes a typical cell arrangement utilizing a standard photoelectrolytic cell.

As described above, much work has been done in combining solar energy with that body of electrolysis art which produces hydrogen for running, for example, a fuel cell, the marriage of the two arts providing a great source of electrical energy with limitless potential. However, such combination has been difficult because of the small amounts of energy which can be extracted from the sun without cumbersome equipment and the corrosion, overpotential, and other problems associated with the use of conventional electrolytes. The use of bromide compounds, and especially hydrogen bromide, as electrolytes in such a cell environment provides surprising advantages. The lower potentials at which a hydrogen bromide cell can be run, for example, compared to the higher cell potentials necessary for the dissociation of water or chloride compounds, both increases the life of the components of the cell and makes available a broader range of semiconductor material than is presently usable in such cells. Furthermore, the dissociation products from other halogen electrolytes such as hydrogen iodide or hydrogen fluoride, exist as solids or much more corrosive gases under normal conditions of atmosphere and pressure. This presents a myriad of problems of precipitation and special handling in both the electrolytic cell and the fuel cell. And a hydrogen bromide electrolyte provides more energy storage per pound than, for example, hydrogen iodide in an electrolytic cell environment.

While the present invention has been described in terms of producing hydrogen for use in a fuel cell, the bromine produced also has fuel cell utility. Note in this regard, an article by Glass et al, "Performance of Hydrogen-Bromine Fuel Cells", *Advances in Chemistry Series*, Volume 47, 1964, A.C.S. Applied Publications, which describes the various advantages of such a system.

The bromide cell of the present invention can also be run at reduced pressures and concentrations such that the photoelectrolytic cell can be used with voltages equivalent to the use of such things as hydrogen iodide but with the advantages of dealing with the liquid bromine produced, thus eliminating the problems associated with a product which exists as a solid such as iodine under normal solution conditions. Also, the large optical absorption coefficients of even dilute solutions of other halogen dissociation products such as iodine would have a severely adverse effect on the efficiency of a system which utilizes radiant energy such as light as a power source as in the disclosed invention.

Another advantage of the bromide electrolyte system is that conventional electrolytic cells for the dissociation of water can be readily adapted to a bromide electrolyte system with little or no modification. Chloride or fluoride electrolyte systems, for example, which are more corrosive than even conventional water dissociation systems and solid iodine dissociation products would all clearly require greater modification. There are also very definite advantages of the bromide system in the elimination of the overvoltages associated with chloride and especially water dissociation products. Note the Glass et al article mentioned supra at page 204 and U.S. Pat. No. 4,021,323 at column 7.

While solar energy is the preferred source of radiation in the process and apparatus of the invention, other radiant energy sources can be used such as laser radiation or light emitting solid state diodes, the only requirement being that the radiant energy be of proper wavelength and sufficient intensity to evolve hydrogen gas in the particular cell being irradiated. The proper wavelength required relates to the particular semiconductor being used. The wavelength must be short enough to at least match the characteristic band gap wavelength of the particular semiconductor used. The semiconductor will not absorb radiant wavelengths longer than its band gap radiation characteristic. In fact, one of the advantages of the present invention is the elimination of the corrosion and oxidation problems of conventional electrolytes which attack many semiconductor materials, thus enabling a broader range of semiconductor material to be used. With a broader range of semiconducting material thus available, a broader range of light wavelength can be used to more efficiently power the system. Also, while it is preferred to run the electrolysis solely powered by radiant energy, such as light, great advantages can also be realized by combining the light powered system with an external power source such as a battery. This is of particular value in instances where the semiconductor-radiation combination produces insufficient photovoltage to meet the threshold voltage required to run the cell. Note the Nernst equation, infra. For example, for a 48% solution of HBr 0.6 volt would be required to run the cell, thus any semiconductor-radiation combination producing less than that voltage with such solution would require an external power source. Even with sufficient voltage supplied by the radiation source the external power source could also be used to increase the rate of hydrogen gas evolution, although at a cost in efficiency of the system. In any case, the amount of voltage supplied from this external power source must be less than that required to electrolyze the bromide compound in the absence of the light irradiated semiconductor electrode in order to have an energy efficient system. In such a situation, the energy recovered from the recombination of, for example, hydrogen and bromine in a fuel cell would be approximately equal to the sum of the solar input energy and external energy supplied.

As stated above, with the system of the present invention a broader range of semiconductor material is available for solar collection because of the solving of overvoltage and corrosion problems associated with other conventional electrolytes in similar systems, and in the particular embodiment of this invention the use of amorphous silicon has been found to produce several advantages. First of all, in many conventional systems because of the corrosion problems associated with electrolytic environments similar to that of the present invention but selected for oxygen and hydrogen production rather than bromine and hydrogen (note the Frank and Bard article supra) amorphous silicon would not be available as a viable solar collection source. However, with the amorphous silicon of the present invention such is not the case. It also has advantages over conventional titanium dioxide semiconductors which can only collect radiant energy at wavelengths below about 4,000 Å in that the amorphous silicon can collect radiant energy at wavelengths up to about 7,250 Å. In the bromide system of the present invention the amorphous silicon also has a corrosion resistance at least comparable to $TiO_2$ and about the same as single crystal Si. The source of energy to run the cell can be any radiant energy source with wavelengths shorter than the band gap radiation characteristic of the semiconductor used. For example, for the amorphous silicon semiconductor of the present invention any light source with wavelengths less than b 7,250 Å will run the system.

Other advantages of the amorphous silicon include the fact that it has a wider band gap and higher photovoltage than, for example, single crystal silicon therefore requiring less (or no) external power to run a photocell including the amorphous silicon semiconductor. The amorphous silicon has a band gap of about 1.7 ev allowing it to capture light of up to about 7,250 Å wavelength. It has a corrosion resistance comparable to single crystal silicon with a higher absorption coefficient for light. Accordingly, one of the big advantages of using amorphous silicon is that very thin layers can be used in the photocells of the present invention. For example, a layer 2 microns or less of amorphous silicon can be used in the semiconductors of the present invention whereas about 25 times that thickness would be needed for a single crystal silicon semiconductor and about 50 times that thickness would be needed for a boron phosphide semiconductor. And its increased wavelength gathering power alone is enough to make it preferable to titanium dioxide semiconductors in the photocells of the present invention. Another advantage of the amorphous silicon of the present invention is the cost factor, since the amorphous silicon would be significantly less costly than single crystal silicon.

The amorphous silicon photo anodes of the present invention will be used n-doped with such dopants as phosphorous, boron, or arsenic in conventional manner. P-doped amorphous silicon can be used as the photo cathode as can p-doped crystalline silicon and boron phosphide. Nonphoto active cathodes such as platinum, titanium and graphite can also be employed. And as ohmic contacts, such materials as aluminum, gold and molybdenum are preferred and can be deposited by such conventional methods as vapor deposition, cathode sputtering, etc.

The amorphous silicon is preferably used deposited on a substrate for both economic and efficiency reasons. In order to be free-standing, the amorphous silicon would have to have substantial thickness. This would obviously be more costly than using a thinner material. Furthermore, if the amorphous silicon gets too thick it adversely affects the resistance of the cell. Accordingly, the amorphous silicon should not be used so thick as to produce a significant increase in resistance of the cell and not so thin as to permit significant transmission of light through the silicon. While amorphous silicon can be deposited on substrate material in thicknesses up to 10 microns, it is preferably deposited in thicknesses less than 2 microns and most preferably 1 to 2 microns. As substrate material relatively inexpensive metals or thin film metal plated on glass are preferred. Substrates such as single crystal n-type silicon, gold or aluminum can be used and even a relatively inexpensive material such as steel or stainless steel is usable.

While commercially prepared amorphous silicon may be used in the present invention, amorphous silicon made by conventional plasma decomposition of silane under low pressure methods is particularly preferred. Note *Applied Physics Letter* 34(2), Melville et al, pps. 173 and 174 Jan. 15, 1979, the disclosure of which is incorporated by reference. As described in the publication, in order to insure the wide band gap and high absorption coefficients of the amorphous silicon, hydrogen incorporation is important.

It was also found that under the conditions tested (note the Example) there was no detectable corrosion of the amorphous silicon when the amorphous silicon was coated with a thin layer of platinum. The platinum can be deposited by conventional vapor deposition techniques and while layers of platinum up to about 100 Å thick can be used, in the system tested it was estimated that the platinum layer was less than 50 Å thick.

The Nernst equation which governs the cell potential relationship required for electrolysis in this process can be described as follows:

$$E = E° + 0.059 \log P_{H2} + 0.059 \log C_{Br2} - 0.059 \log C_{HBr}$$

wherein

- $E°$ = standard cell potential for cell components (e.g. for HBr electrolysis 1.06 volt),
- $P_{H2}$ = partial pressure of hydrogen produced in the cell, p1 $C_{Br2}$ = molar concentration of bromine liquid produced in the cell,
- $C_{HBr}$ = molar concentration of hydrogen bromide or other bromide in the cell,
- $E$ = the threshold voltage or cell potential to be overcome by the photovoltage. This is the voltage at which current begins to flow in the cell and significant amounts of hydrogen and bromine begin to evolve.

The preferred parameters for efficient operation of the cell of the present invention are:

$P_{H2} > 0.05$ psi
$C_{Br2} > 0.1\%$
$C_{HBr} < 48\%$

A cell with such parameters can be efficiently run at temperatures between about 0° and 100° C. Percents as recited throughout the disclosure are percents by weight.

The particular bromide electrolyte system of the invention and the advantages inherent in its use because of the cell potential, lack of oxidation-corrosion problems, and elimination of overpotential problems of conventional cells allow many different cell arrangements to be used in the performance of the invention. One arrangement can comprise a standard cell arrangement with the entire cell subject to radiation from a light source. Other arrangements can comprise cells with one metal electrode and one semiconductor electrode where the semiconductor can be irradiated either from the solution side or dry side of the cell.

As stated above, the key component in the electrolytic solution is the bromide compound present in the solution in amounts up to about 50% by weight, with a concentration of about 48% by weight preferred. This provides the hydrogen (and bromine if desired) to run the ultimate fuel cell which the photoelectrolytic cell is intended to produce. While water is the preferred solvent for the electrolyte and hydrogen bromide the preferred electrolyte the system is readily adaptable to other solvents and bromide containing electrolytes. For example, alcohols or amines may be used as solvents for the system and such bromide electrolytes as KBr, NaBr, LiBr, CsBr and $SrBr_2$ may be used either individually, as mixtures or admixtures with the HBr. If alcohol or amine solvents are employed it is preferred to add at least small amounts of water to the system, especially if a bromide other than HBr is used as the bromide electrolyte. The concentration of the hydrogen bromide may be any concentration up to the saturation point of the solution, provided the cell potential does not reach the corrosion potential for the semiconductor being used. The system may also be run at any operable pressure with up to 1 atmosphere being preferred.

Reference is now made to the various figures for details of the cell configuration. In FIG. 1 a conventional electrolytic cell housing 1 comprising an n-type amorphous silicon semiconducting anode 2 and a p-type semiconducting cathode 3 are connected through external circuit 4. The electrolyte solution 5 is a 48% solution of hydrogen bromide and water separated by a hydrogen ion permeable membrane 6 such as Nafion ® (E. I. Dupont de Nemours and Co.), thin quartz, polyvinyl choride, or polytetrafluoroethylene, which alloy free hydrogen ion transport in the system. Upon activation with a light or other radiant energy 7 current is conducted through the external circuit 4 upon dissociation of the hydrogen bromide, resulting in the production of hydrogen gas 8 in the p-electrode chamber and liquid bromine 9 in the n-electrode chamber.

Figure 2:
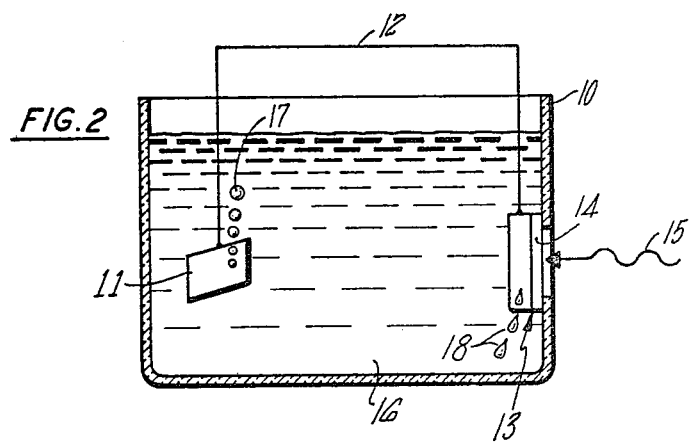
FIG. 2 describes a second arrangement where the radiant energy source activates from the dry side of the cell.

In FIG. 2, a dry side irradiation cell arrangement is depicted wherein the cell housing 10 contains a metal electrode 11, such as platinum or titanium, connected by external circuit 12 to the amorphous silicon semiconductor electrode 13 containing a tin oxide outer layer 14. When light or other radiant energy 15 impinges on semiconductor 13, the hydrogen bromide electrolyte solution 16 dissociates, causing the migration of the hydrogen ions to the platinum or titanium cathode 11 and bromide ions to semiconductor photo anode 13, resulting in the evolution of hydrogen gas 17 at electrode 11 and liquid bromine 18 at electrode 13.

Figure 3:
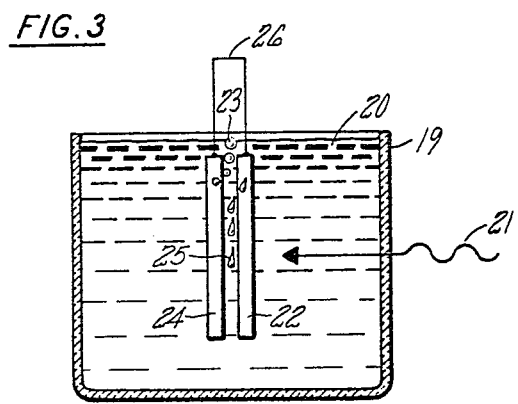
FIG. 3 describes another arrangement where the radiant energy source activates from the solution side of the cell.

FIG. 3 demonstrates another solution side radiation apparatus. Housing 19 encloses the hydrogen bromide and water electrolyte solution 20 which is subjected to light or other radiation 21. When the radiation impinges amorphous silicon semiconductor surface 22, charge transfer across the electrolyte-semiconductor interface takes place, discharging hydrogen ions in the solution and thus hydrogen gas 23 is evolved at the platinum electrode 24 and liquid bromine 25 at electrode 22. The transfer of charge across the electrolyte-semiconductor interface results in an imbalance of charge in the semiconductor and a driving voltage for current flow through an external circuit 26 to electrode 24 immersed in the electrolyte.

EXAMPLE

A 48% by weight solution of hydrogen bromide in water was placed in an electrolytic cell comprised of an n-type amorphous silicon anode and a platinum cathode. The silicon had an extremely thin (less than 100 Å and estimated to be less than 50 Å) layer of platinum on its surface. No external power source was impressed across the semiconductors. The system was run at room temperature (about 25° C.) and subjected to about 5 milliwatts of optical power produced by a helium neon laser ($\lambda = 6328$ Å). The photoanode had dimensions of 0.080"×0.120" and produced a current of about 15 $\mu$ amps. A conversion efficiency of about 0.5% was estimated for this run. The system was run for about 15 hours producing bromine liquid at the amorphous silicon electrode and hydrogen gas at the platinum electrode. No corrosion of the semiconductors was detected.

Although this invention has been shown and described with respect to a preferred embodiment thereof, it should be understood by those skilled in the art that various changes and omissions in the form and detail thereof may be made therein without departing from the spirit and scope of the invention.

Having thus described a typical embodiment of my invention, that which I claim as new and desire to secure by Letters Patent of the United States is:

1. A process for producing hydrogen gas from an electrolyte solution in an electrolytic cell, wherein the improvement comprises utilizing a solution of a bromide compound as the electrolyte in conjunction with radiant energy and an n-type semiconducting amorphous silicon photo anode to at least partially power the electrolytic cell.

2. The process of producing hydrogen gas in an electrolytic cell comprising:
providing an electrolytic cell enclosure containing a bromide electrolyte solution;
immersing an n-type semiconducting amorphous silicon photo anode and a nonphoto active cathode into the bromide electrolyte solution;
separating said electrodes by a hydrogen ion permeable membrane also immersed in said bromide electrolyte solution;
exposing the semiconducting electrode to radiant energy of proper wavelength and sufficient intensity to cause the evolution of hydrogen gas at the cathode and bromine liquid at the anode.

3. A process of producing hydrogen gas in an electrolytic cell comprising:
providing an electrolytic cell enclosure containing a bromide electrolyte solution;
placing a platinum cathode and an n-type semiconducting amorphous silicon photo anode into the bromide electrolyte solution, wherein the semiconducting electrode also forms part of the wall of the electrolytic cell enclosure containing the platinum cathode and bromide solution;
irradiating the semiconducting photo anode from that side of the semiconducting photo anode which represents the wall portion of the cell containing the bromide solution with radiant energy of proper wavelength and sufficient intensity to evolve hydrogen gas at the platinum cathode and liquid bromine at the semiconducting photo anode.

4. The process of producing hydrogen gas in an electrolytic cell comprising providing an electrolytic cell enclosure containing a bromide electrolyte solution;
placing a platinum cathode and an n-type semiconducting amorphous silicon photo anode in a bromide electrolyte solution;
subjecting the semiconducting photo anode to a radiant energy source of proper wavelength and sufficient intensity to evolve hydrogen gas at the platinum cathode in the space between the two electrodes and liquid bromine at the semiconductor photo anode into the solution between the area defined by the electrodes.

5. The process of claims 1, 2, 3 or 4 wherein the bromide electrolyte comprises a compound selected from the group consisting of HBr, NaBR, KRr, LiBr, CsBr, SrBr$_2$ and mixtures thereof.

6. The process of claim 5 wherein the bromide compound is present in an amount of up to about 50% by weight and the solvent is water.

7. The process of claims 1, 2, 3 or 4 wherein the radiant energy is solar energy.

8. The process of claims 1, 2, 3 or 4 wherein the radiant energy is laser radiation.

9. The process of claims 1, 2, 3 or 4 wherein the radiant energy is produced by a light emitting solid state diode.

10. The process of claims 1, 2, 3 or 4 wherein the radiant energy is light of wavelength up to about 7,250 Å.

11. The process of claims 1, 2, 3 or 4 wherein the electrolyte is a 48% by weight solution of HBr in water.

12. The process of claims 1, 2, 3 or 4 wherein the amorphous silicon is on a supportive substrate and contains a layer of platinum less than 100 Å thick on that side of the silicon opposite the substrate.

* * * * *